United States Patent [19]

Kadowaki et al.

[11] Patent Number: 5,521,854
[45] Date of Patent: May 28, 1996

[54] POWER-SAVING CONTROL FOR A CONTROL UNIT IN A COMPUTER SYSTEM

[75] Inventors: Tomohiko Kadowaki; Hiroyuki Chikamatsu; Yutaka Karasawa; Masafumi Hozumi; Hidefumi Sugihara, all of Ibaraki, Japan

[73] Assignee: Intel Corporation, Santa Clara, Calif.

[21] Appl. No.: 363,571

[22] Filed: Dec. 21, 1994

Related U.S. Application Data

[63] Continuation of Ser. No. 4,554, Jan. 14, 1993, abandoned.

[30] Foreign Application Priority Data

Jan. 16, 1992 [JP] Japan ................... 4-024329

[51] Int. Cl.⁶ ........................................ G06F 1/32
[52] U.S. Cl. .............................. 364/707; 395/750
[58] Field of Search ........................ 364/492, 493, 364/579, 707, 141, 143, 273.1, 273, 273.5; 395/750

[56] References Cited

U.S. PATENT DOCUMENTS

| | | | |
|---|---|---|---|
| 4,203,153 | 5/1980 | Boyd | 364/200 |
| 4,371,789 | 2/1983 | Chen et al. | 364/492 X |
| 4,598,383 | 7/1986 | Leach | 364/707 X |
| 4,674,031 | 6/1987 | Siska, Jr. | 364/141 X |
| 4,747,041 | 5/1988 | Engel et al. | 364/492 X |
| 4,763,333 | 8/1988 | Byrd | 364/200 X |
| 4,777,544 | 10/1988 | Brown et al. | 324/226 |
| 4,841,440 | 6/1989 | Yonezu et al. | 364/200 |
| 4,980,836 | 12/1990 | Carter et al. | 364/483 |
| 5,021,983 | 6/1991 | Nguyen et al. | 364/707 |
| 5,163,124 | 11/1992 | Yabe et al. | 395/750 |
| 5,167,024 | 11/1992 | Smith et al. | 395/375 |
| 5,239,652 | 8/1993 | Seibert et al. | 395/750 |
| 5,361,364 | 11/1994 | Nagashige et al. | 395/750 |

Primary Examiner—Emanuel T. Voeltz
Assistant Examiner—M. Kemper
Attorney, Agent, or Firm—Blakely, Sokoloff, Taylor & Zafman

[57] ABSTRACT

A power-saving control system for an MCU includes a plurality of functional portions, a switch, and a register. The functional portions includes a CPU. The switch ON/OFF-controls supply of electric power from a power supply to the respective functional portions. The register stores data for ON/OFF-controlling the switch. The switch is ON/OFF-controlled in accordance with contents of the register, thereby stopping an operational function of each functional portion in an inactive state.

22 Claims, 2 Drawing Sheets

POWER-SAVING CONTROL FOR A CONTROL UNIT IN A COMPUTER SYSTEM

This is a continuation of application Ser. No. 08/004,554, filed Jan. 14, 1993 now abandoned.

BACKGROUND OF THE INVENTION

The present invention relates to a power-saving control system for MCU (Micro Controller Unit) having a plurality of functional portions including a CPU (Central Processing Unit).

In order to reduce the size of a control circuit for controlling a hard disk or the like, an MCU has recently been developed as such a control circuit. The MCU is a one-chip device including a control portion, e.g., a CPU, and a peripheral portion, e.g., an A/D converter and a D/A converter. Many CPUs of such MCUs have a power-saving mode such as a sleep mode to reduce their electric power consumption while they are inactive. Once the power-saving mode is set in the CPU, the functional operation of the CPU is almost stopped. As a result, the overall functional operation of the MCU is stopped.

As described above, in the conventional system, when the power-saving mode is set in the CPU, the overall operation of the devices is stopped. Therefore, the operation of only a specific device cannot be stopped, and electric power is unnecessarily kept supplied to even devices in an inactive state. As a result, electric power is wasted. On the other hand, there has recently been increasing demand for reducing in the power consumption of the MCU even when the CPU is in operation.

SUMMARY OF THE INVENTION

It is, therefore, a principal object of the present invention to provide a power-saving control system for an MCU, which can reduce the power consumption of the MCU more than a conventional system.

In order to achieve the above object, according to an aspect of the present invention, there is provided a power-saving control system for an MCU, comprising a plurality of functional portions including a CPU, a switch for ON/OFF-controlling supply of electric power from a power supply to the respective functional portions, and a register for storing data for ON/OFF-controlling the switch, wherein the switch is ON/OFF-controlled in accordance with contents of the register, thereby stopping an operational function of each functional portion in an inactive state.

DESCRIPTION OF THE PREFERRED EMBODIMENT

The present invention will be described below with reference to the accompanying drawings.

Figure 1:
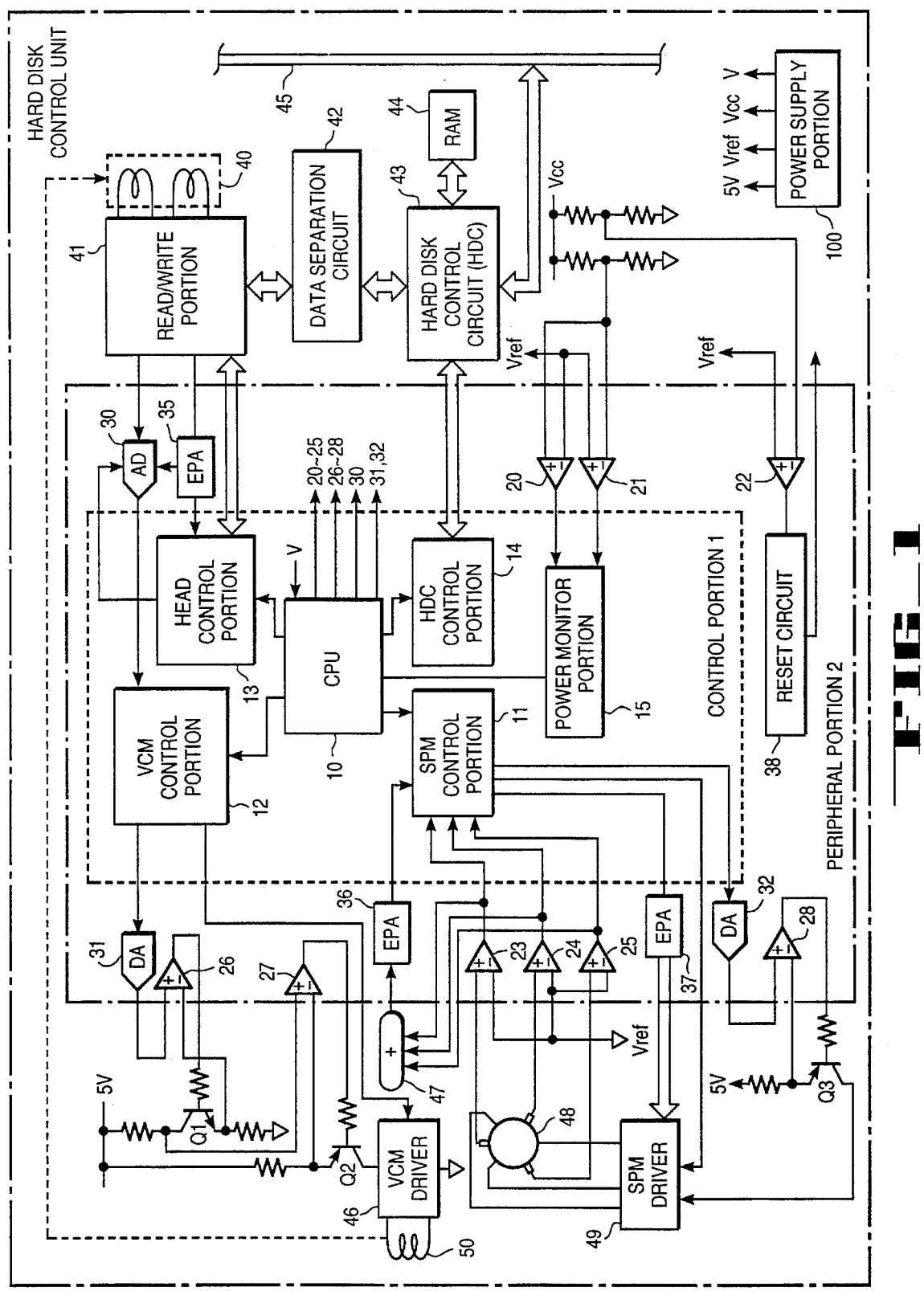
FIG. 1 is a block diagram showing a hard disk control unit to which a power-saving control system for an MCU according to an embodiment of the present invention is applied.

FIG. 1 shows a unit to which a power-saving control system for an MCU according to an embodiment of the present invention is applied. This unit is a hard disk control unit for controlling a hard disk (not shown).

Referring to FIG. 1, reference numeral 1 denotes a control portion which controls writing/reading of data on/from the hard disk by executing a program; and 2, a peripheral portion constituted by a peripheral circuit for controlling the hard disk. The control portion 1 and the peripheral portion 2 are integrated into a single chip to constitute an MCU as a microcontroller device.

The control portion 1 comprises a CPU 10, an SPM control portion 11 for controlling the speed of a motor (to be referred to as an SPM hereinafter) 48 for rotating the hard disk, a VCM control portion 12 for controlling a voice coil motor (to be referred to as a VCM hereinafter) 50 for positioning a head 40, a head control portion 13 for controlling the head 40, an HDC control portion 14 for controlling a hard disk control circuit (to be referred to as an HDC hereinafter) 43 (to be described later), and a power monitor portion 15 for monitoring the electric power supplied to the control portion 1, and the like.

The peripheral portion 2 comprises comparators 20 to 25, amplifiers 26 to 28, and an A/D (analog-digital) converter 30 for converting an analog signal into a digital signal, D/A (digital-analog) converters 31 and 32 for converting digital signals into analog signals, event processor arrays (to be referred to as EPAs hereinafter) 35 to 37 for performing control regarding occurrence of events, and a reset circuit 38.

In addition to the head 40, the HDC 43, the SPM 48, and the VCM 50, a read/write portion 41 for performing a reading/writing operation with respect to the head 40, a data separation circuit 42, a RAM 44, a bus 45 for permitting communication of data with a host apparatus such as a personal computer (not shown), a VCM driver 46 for driving the VCM 50, an edge detector 47, an SPM driver 49 for driving the SPM 48, transistors Q1 to Q3, and the like are connected to the peripheral portion 2.

Reference numeral 100 denotes a power supply portion for supplying power to the respective portions described above. As will be described later, permitting and stopping the supply of electric power from the power supply portion 100 to the control portion 1 and the respective portions of the peripheral portion 2 can be controlled on the basis of program execution by the CPU 10.

The operation of the hard disk control unit having the above-described arrangement will be briefly described next.

When the host apparatus causes a request for access to the hard disk via the bus 45, the HDC 43, and the HDC control portion 14, the CPU 10 instructs the SPM control portion 11 to rotate the hard disk at a constant speed. The SPM control portion 11 then drives the SPM driver 49 via the EPA 37, the D/A converter 32, the amplifier 28, and the transistor Q3. As a result, the hard disk is rotated at a constant speed by rotation of the SPM 48. At this time, the CPU 10 instructs the VCM control portion 12 to move the head 40 to a predetermined position on the hard disk to permit predetermined data to be written/read on/from the hard disk. Also, the CPU 10 orders the head control portion 13 to enable writing/reading of data on/from the hard disk.

More specifically, upon reception of instructions from the CPU 10, the VCM control portion 12 informs first the VCM driver 46 of the direction of movement of the VCM 50, and also supplies a predetermined digital signal to the D/A converter 31. This digital signal is converted into an analog signal of a predetermined amount and supplied to the transistor Q2 via the amplifier 26, the transistor Q1, and the amplifier 27. As a result, the VCM 50 is driven by the VCM driver 46 to move the head 40 to a desired position. Meanwhile, the head control portion 13 which has received instructions from the CPU 10 controls the read/write portion 41. With this operation, data sent from the host apparatus via the bus 45, the HDC 43, the RAM 44, and the data separation circuit 42 is written on the hard disk at a desired position by the head 40. Data recorded on the hard disk is read out under the control of the head control portion 13 and is supplied to the host apparatus via the data separation circuit 42, the HDC 43, the RAM 44, and the bus 45.

Figure 2:
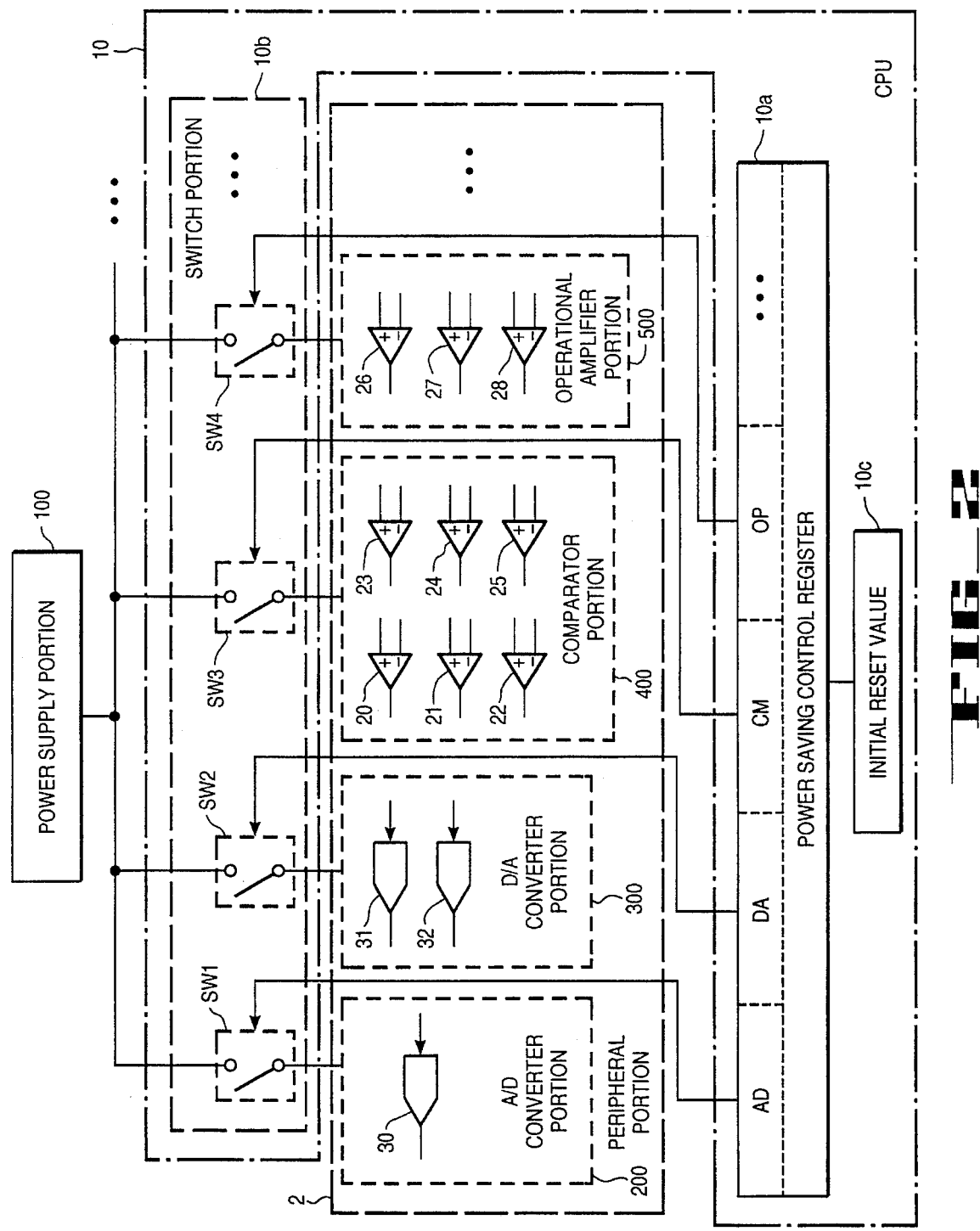
FIG. 2 is a block diagram showing the main portion of the unit in FIG. 1.

FIG. 2 shows the main control portion of a power supply system based on the CPU 10, which system is designed to supply electric power to the respective portions of the hard disk control unit. More specifically, FIG. 2 shows conditions for permitting and stopping the supply of electric power from the power supply portion 100 to the respective functional portions of the peripheral portion 2. Referring to FIG. 2, reference numeral 10A denotes a power-saving control register arranged in the CPU 10; and 10B, a switch portion constituted by switches SW1 to SW4 arranged in the CPU 10 in the same manner as the power-saving control register 10A. Reference numerals 200 to 500 denote functional portions of the peripheral portion 2. More specifically, reference numeral 200 denotes an A/D converter portion including the A/D converter 30 and the like; 300, a D/A converter portion constituted by the D/A converters 31 and 32 and the like; 400, a comparator portion constituted by the comparators 20 to 25 and the like; and 500, an operational amplifier portion constituted by the amplifiers 26 to 28.

The power-saving control register 10A is capable of permitting and stopping the supply of electric power to the respective functional portions ranging from the A/D converter portion 200 to the operational amplifier portion 500, separately. For example, if the AD bit in the register 10A is set to "0", the switch SW1 is closed. Under this condition, electric power is supplied from the power supply portion 100 to the A/D converter portion 200. If the AD bit is set to "1", the switch SW1 is opened, thus stopping the supply of the electric power to the A/D converter portion 200.

Similar operations are performed for the D/A converter portion 300, the comparator portion 400, and the operational amplifier portion 500. If the DA, CM, and OP bits in the register 10A are respectively set to "0" or "1", the switches SW2 to SW4 are closed or opened. As a result, the D/A converter portion 300, the comparator portion 400, and the operational amplifier portion 500 are separately supplied with electric power or deenergized.

The operation of the CPU 10 for performing control to permit and stop the supply of electric power to the peripheral portion 2 will be described in detail below with reference to the block diagrams in FIGS. 1 and 2.

Upon reception of electric power from the power supply portion 100, the CPU 10 normally closes the switch SW3 in the switch portion 10B in FIG. 2 to always supply electric power from the power supply portion 100 to the comparators 20 and 21 serving as inputs of the power monitor portion 15 in the peripheral portion 2, because the CPU 10 always monitors through the power monitor portion 15 whether desired electric power Vcc is supplied from the power supply portion 100 to the control portion 1. In addition, electric power is always supplied to the comparator 22 to generate a reset signal through the reset circuit 38 when the electric power Vcc drops to a specific voltage or less. Since the switch SW3 of the switch portion 10B is normally closed, electric power is always supplied from the power supply portion 100 to the remaining comparators 23 to 25 as well.

Upon reception of a request for access to the hard disk from the host apparatus, the CPU 10 closes the switches SW2 and SW4 in the switch portion 10B in FIG. 2 to supply electric power to the amplifier 28 and the D/A converter 32 in the peripheral portion 2, and also instructs the SPM control portion 11 to rotate the hard disk at a constant speed. Upon reception of this instruction, the SPM control portion 11 controls the D/A converter 32, to which electric power is supplied, and the EPA 37 as well, and drives the SPM driver 49. As a result, the SPM 48 is rotated, and the hard disk is rotated at a constant speed upon rotation of the SPM 48 at a constant speed. In this case, since the switches SW2 and SW3 in FIG. 2 are kept closed, electric power is also supplied from the power supply portion 100 to other components of the peripheral portion 2, i.e., the D/A converter 31 and the amplifiers 26 and 27.

At this time, in order to allow predetermined data to be read/write from/on the hard disk, the CPU 10 instructs the VCM control portion 12 to move the head 40 to a predetermined position, and also instructs the head control portion 13 to be ready for a data read/write operation with respect to the hard disk. In this case, the VCM control portion 12 instructs the VCM driver 46 for the moving direction of the VCM 50, and also supplies a predetermined digital signal to the D/A converter 31, to which electric power has already been supplied. This digital signal is converted into an analog signal of a predetermined amount. The analog signal is then output to the VCM driver 46 through the amplifiers 26 and 27 and the like, to which electric power has already been supplied. The CPU 10 controls the head control portion 13 and closes the switch SW1 in the switch portion 10B in FIG. 2 to supply electric power from the power supply portion 100 to the A/D converter 30 in the peripheral portion 2. The data for the head positioning readout by the head 40 is provided to the A/D converter 30 through the read/write portion 41 and is converted into a digital signal by the A/D converter 30, to which electric power has been supplied. The digital signal is then supplied to the VCM control portion 12. As a result, the VCM 50 is driven to move the head 40 to a desired position. The read/write portion 41 is then controlled by the head control portion 13. With this operation, data from the host apparatus is recorded on the hard disk at a desired position by the head 40.

When data recorded on the hard disk is to be read out, the data recorded on the hard disk is read out by the head 40 and the read/write portion 41 under the control of the head control portion 13 and supplied to the host apparatus through the data separation circuit 42, the HDC 43 controlled by the HDC control portion 14, the RAM 44, and the bus 45.

When such a sequence of data read/write operations with respect to the hard disk is completed, the CPU 10 opens the switches SW1, SW2, and SW4 to stop the supply of electric power to the A/D converter portion 200, the D/A converter portion 300, and the operational amplifier portion 500.

Note that a reset initial value 10C is set in the power-saving control register 10A in the process of a reset operation when the power switch is turned on. Thereafter, the value is sequentially changed or updated in accordance with the operation/control state of each portion in the process of program processing.

In this embodiment, electric power is supplied to the amplifiers 23 to 25 at the same time when electric power is supplied to the comparators 20 to 22. However, the number of switches in the switch portion 10B may be increased to independently control the supply of electric power to the comparators 20 to 22 and to the comparators 23 to 25. With this arrangement, for example, electric power can be supplied to the comparators 23 to 25 only when the hard disk is to be controlled. In addition, permitting and stopping the supply of electric power to the CPU 10 can be controlled in the same manner as described above.

In the embodiment, the power-saving control register 10A and the switch portion 10B are incorporated in the CPU 10. However, these portions may be arranged outside the CPU 10 to be controlled by the CPU 10. In addition, in the embodiment, the separate switches are arranged in units of functional portions, and the supply of electric power is collectively controlled in units of functional portions. However, a switch may be arranged for each device or for each set of a plurality of arbitrary devices so as to control the supply of electric power. Furthermore, in the embodiment, the MCU constituted by the control portion 1 including the CPU 10 and the peripheral portion 2 is applied to a hard disk control unit for controlling the hard disk. Even if, however, the MCU is applied to other types of control units, the same effects as described above can be obtained.

By separately setting the respective bits of the power-saving control register 10A in this manner, the supply of electric power to the corresponding functional portions can be controlled respectively. As a result, the supply of electric power to functional portions to which no electric power is required in terms of functional operation can be independently stopped, thereby reducing the overall power consumption of the MCU.

As has been described above, according to the present invention, the supply of electric power to a plurality of functional portions including a CPU can be independently stopped. Therefore, by stopping the supply of electric power to functional portions in an inactive state, the overall power consumption of the MPU can be reduced.

What is claimed is:

1. A control unit for controlling access to a peripheral device in a computer system, the control unit comprising;
   a power supply;
   a plurality of circuit components to control operation of the peripheral device; and
   a central processing unit coupled to the power supply, wherein the central processing unit is integrated on a single chip with said plurality of circuit components in a peripheral portion of the single chip, wherein said central processing unit executes program instructions to coordinate accesses to the peripheral device and operates said control unit in a reduced power consumption state during an access to the peripheral device according to program execution, wherein said central processing unit comprises
      a plurality of power distributors on said chip coupled to said plurality of circuit components and coupled to receive power from the power supply, wherein the plurality of power distributors supplies power to said plurality of circuit components, such that power is independently distributed to said plurality of circuit components on said chip according to program execution,
      a plurality of control storage locations coupled to the plurality of power distributors, wherein each of the plurality of control storage locations stores data for controlling power to each of said plurality of circuit components, wherein power is provided to one of said plurality of circuit components when one of the plurality of control storage locations associated with said one of said plurality of circuit components is set according to program execution,
      a controller coupled to the plurality of control storage locations to set each of the plurality of control storage locations based on program execution by the controller to cause power to be supplied to each of said plurality of circuit components during an access of said peripheral device, wherein the controller sets a first of the plurality of control storage locations for a first time period to cause a first of said plurality of circuit components to be powered during said access and a second of the plurality of control storage locations is set for a second time period different than the first time period to cause a second of said plurality of circuit components to be powered during said access, such that at least two of said a plurality of circuit components receive power for different time periods during said access, thereby reducing power consumption by the control unit under direction of the controller.

2. The control unit of claim 1 wherein said controller causes said first of said plurality of circuit components to receive power upon detecting a request for access to said peripheral device, and further wherein said controller causes said second of said plurality of circuit components to receive power once said access begins, and wherein said controller causes said first and second of said plurality of circuit components to be placed in a reduced power consumption state upon completion of said access.

3. The control unit of claim 1 wherein at least one of said plurality of power distributors comprises a switch.

4. The control claim 1 wherein said plurality of control storage locations comprises a register.

5. The control unit defined in claim 1 wherein the controller sets control storage locations based on program execution, such that permitting and stopping of power to said circuit components is based on program execution.

6. The control unit of claim 1 further comprising a reset mechanism for resetting each of said plurality of control storage locations upon initially powering up each said plurality of control storage locations.

7. The control unit of claim 6 wherein said reset mechanism comprises a reset register coupled to said plurality of control storage locations.

8. The control unit of claim 1 wherein a third of said plurality of control storage locations is coupled to a third of said plurality of circuit components and is set so as to allow said third of said plurality of circuit components to always receive power.

9. The control unit of claim 8 wherein said third of plurality of circuit components enables said controller to monitor power levels in said control unit.

10. A control unit for controlling access to a peripheral device in a computer system, the control unit comprising
   a plurality of circuit components that control the peripheral device;
   a central processing unit integrated on a single chip; and
   a power supply, and
   wherein said central processing unit executes program instructions to coordinate accesses to the peripheral device and operates said control unit in a reduced power consumption state during accesses to the peripheral device according to program execution by the central processing unit, said central processing unit comprising a plurality of power distributors on said chip coupled to receive power from said power supply and coupled to said plurality of circuit components, wherein the plurality of power distributors supplies power to said plurality of circuit components, such that power is independently distributed to said plurality of circuit components on said chip according to program execution, a control register having a plurality of control storage locations coupled to the plurality of power distributors, wherein each of the plurality of control storage locations stores data for controlling power to each of said plurality of circuit components, wherein power is provided to one of said plurality of circuit components when one of the plurality of control storage locations associated with said one of said plurality of circuit components is set according to program execution, a controller coupled to the plurality of control storage locations to set each of the plurality of control storage locations based on program execution by the controller to cause power to be supplied to each of said plurality of circuit components during an access of said peripheral device, wherein the controller sets a first of the plurality of control storage locations for a first time period to cause a first of said plurality of circuit components to receive power from a first of said plurality of power distributors during said access and sets a second of the plurality of control storage locations for a second time period different that the first time period to cause a second of said plurality of circuit components to receive from a second of said plurality of power distributors during said access, and wherein said controller causes said first of said plurality of circuit components to receive power upon detecting a request for access to said peripheral device, and further wherein said controller causes said second of said plurality of circuit components to receive power once said access begins, and wherein said controller causes said first and second of said plurality of circuit components to be placed in said reduced power consumption state upon completion of said access, such that at least two of said plurality of circuit components receive power for different time periods during said access, thereby reducing power consumption by the control unit.

11. The control unit of claim 10 wherein a third portion of plurality of circuit components enables said control portion to monitor power levels in said control unit.

12. The control unit of claim 10 wherein at least one of said plurality of power distributors comprises a switch.

13. The control unit of claim 10 wherein a third of said plurality of control storage locations is coupled to said third of said plurality of circuit components and is set so as to allow said third of said plurality of circuit components to always receive power from said third of said plurality of power distributors.

14. The control unit defined in claim 10 wherein the controller sets control storage locations based on program execution, such that permitting and stopping of power to said circuit components is based on program execution.

15. The control unit of claim 10 further comprising a reset mechanism for resetting each of said plurality of control storage locations upon initially powering up each said plurality of control storage locations.

16. The control unit of claim 15 wherein said reset mechanism comprises a reset register coupled to said plurality of control storage locations.

17. A control unit for controlling access to a peripheral device in a computer system, said control unit comprising:

a power supply to supply power for the control unit;

a plurality of components; and a control portion having a central processing unit coupled to the power supply, wherein the central processing unit executes a program and includes:

a plurality of switches coupled to the plurality of components and the power supply to provide power to the plurality of components when closed, wherein each of the plurality of switches is coupled to provide power to a distinct portion of said plurality of components, wherein each of the plurality of switches is closed for different periods of time according to program execution by the central processing unit to effectuate accesses to the peripheral device;

a control register having a plurality of storage locations coupled to the plurality of switches, wherein each of the plurality of storage locations controls one of the plurality of switches, such that each switch enables power to be received by a portion of the plurality of components when one of the plurality of storage locations corresponding to said each switch is set, wherein said each switch is set for different time periods according to program execution by the central processing unit to effectuate accesses to the peripheral device, wherein the central processing unit sets a first portion of the plurality of storage locations in response to a request for an access to the peripheral device and sets a second portion of the plurality of storage locations to complete the access of the peripheral device in response to executing the program, such that the central processing unit causes a portion of the control unit to be in a first reduced power consumption state during said access, and wherein the central processing unit clears the second portion of the plurality of storage locations upon completion of said access, such that the control unit is placed in a second reduced power consumption state, such that at least two of said plurality of components receive power for different time periods during said access, such that the central processing unit operates in a reduced power consumption state during accesses to the peripheral device according to program execution by the central processing unit.

18. The control unit of claim 17 where the plurality of components comprises analog-to-digital converter circuitry, digital-to-analog converter circuitry, comparator circuitry and operational amplifier circuitry.

19. The control unit of claim 17 wherein the peripheral device comprises a hard disk and further wherein said central processing unit sets at least one of the plurality of switches upon receiving a request for access to the hard disk.

20. The control unit of claim 17 wherein the peripheral device comprises a hard disk and further wherein the central processing unit sets at least one of the plurality of switches to allow a read/write operation to the hard disk.

21. The control unit defined in claim 17 wherein the controller sets control storage locations based on execution of the program, such that permitting and stopping of power to said circuit components is based on program execution.

22. The control unit of claim 17 wherein the central processing unit further comprises a plurality of control portions, wherein each of the plurality of control portions is coupled to individual circuit components of the plurality of circuit components and receives instructions from the controller to perform one or more control functions associated with accessing the peripheral device, wherein each of the plurality of control portions receives instructions and sub sequently performs at least one function at the same time said individual circuit components associated with each of the plurality of control portions receive power.

* * * * *